Nov. 18, 1924.
G. H. SETHMAN
1,515,971
ELECTRIC GENERATOR
Filed Sept. 7, 1920
3 Sheets-Sheet 1
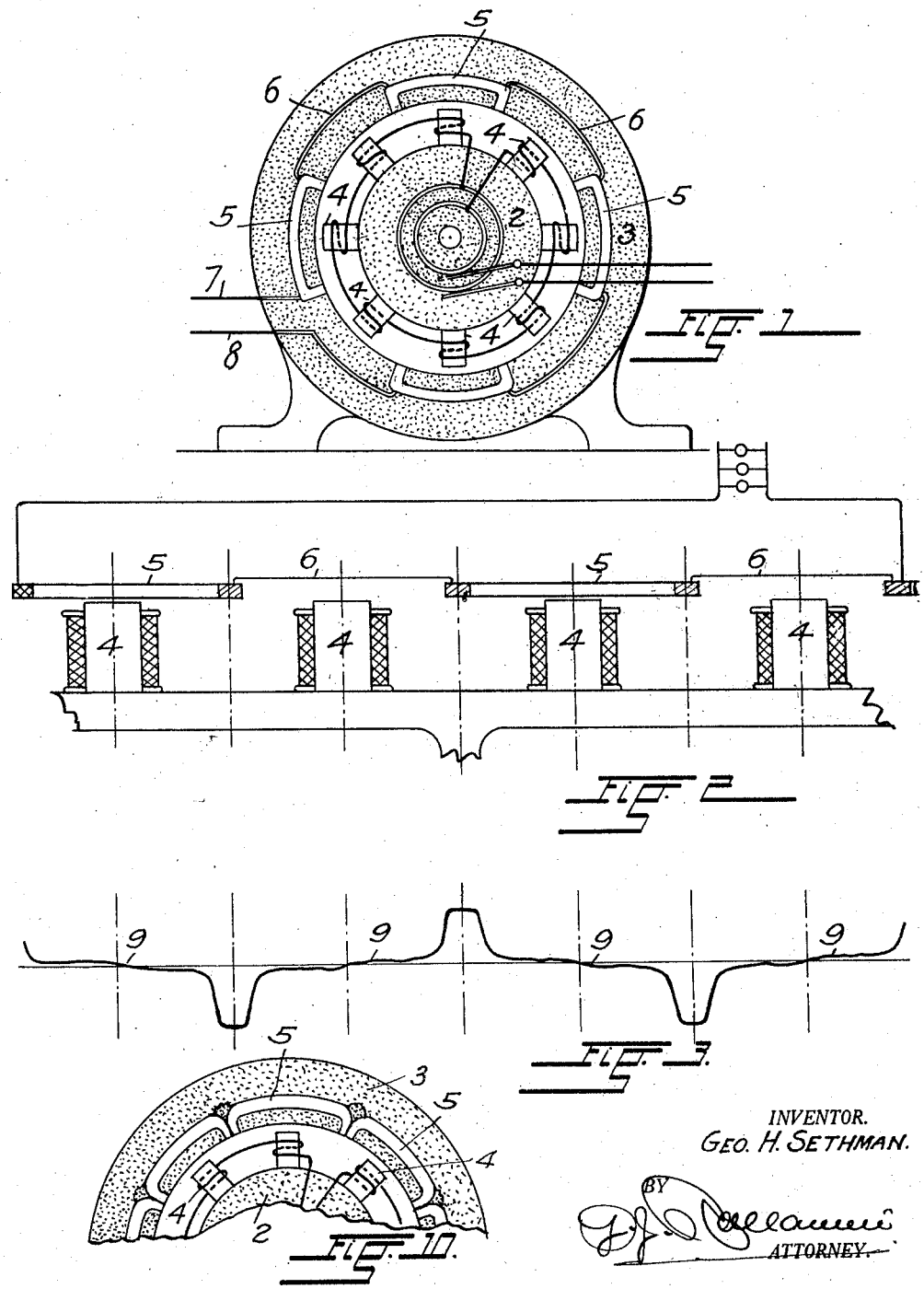
INVENTOR.
GEO. H. SETHMAN.
BY
ATTORNEY.

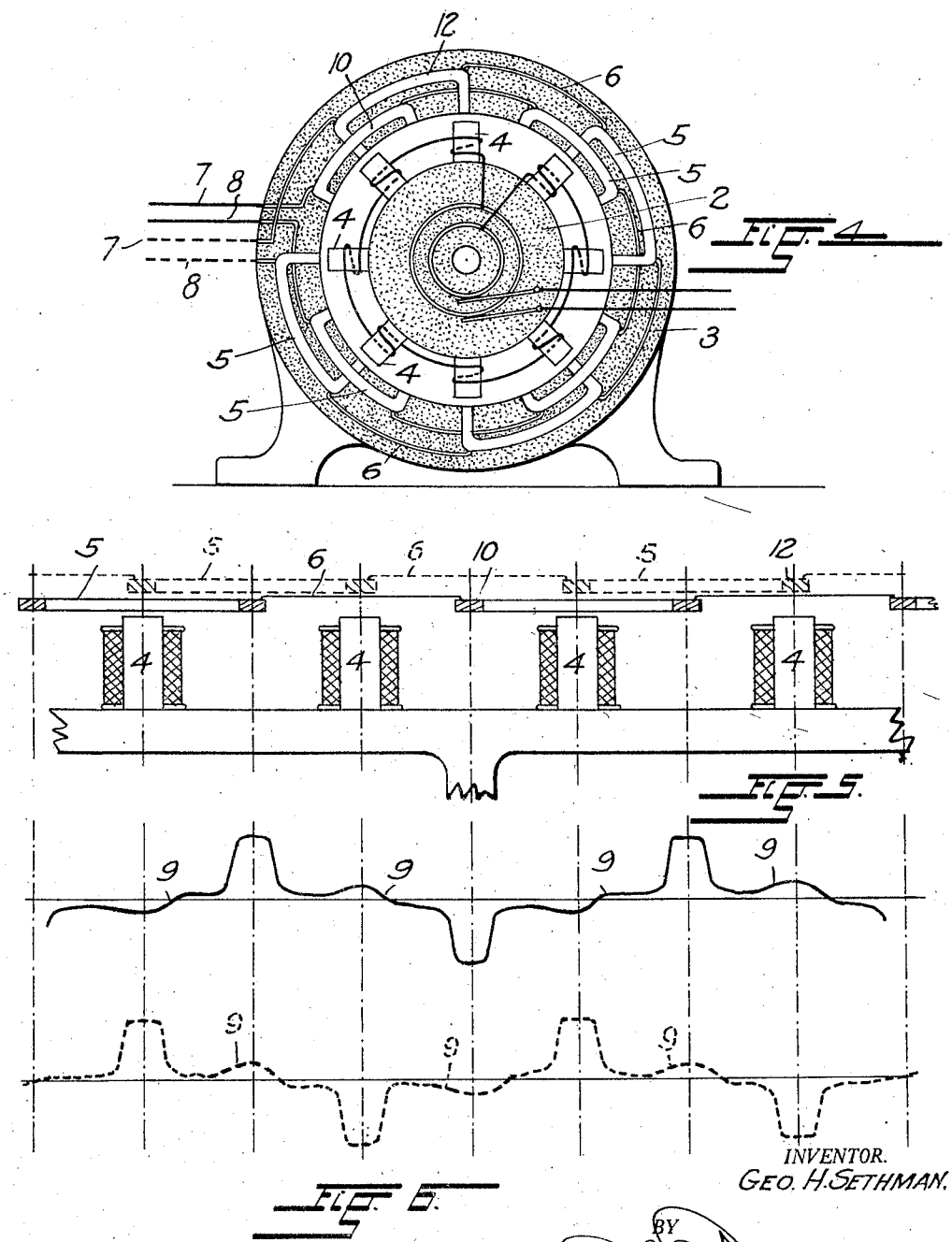

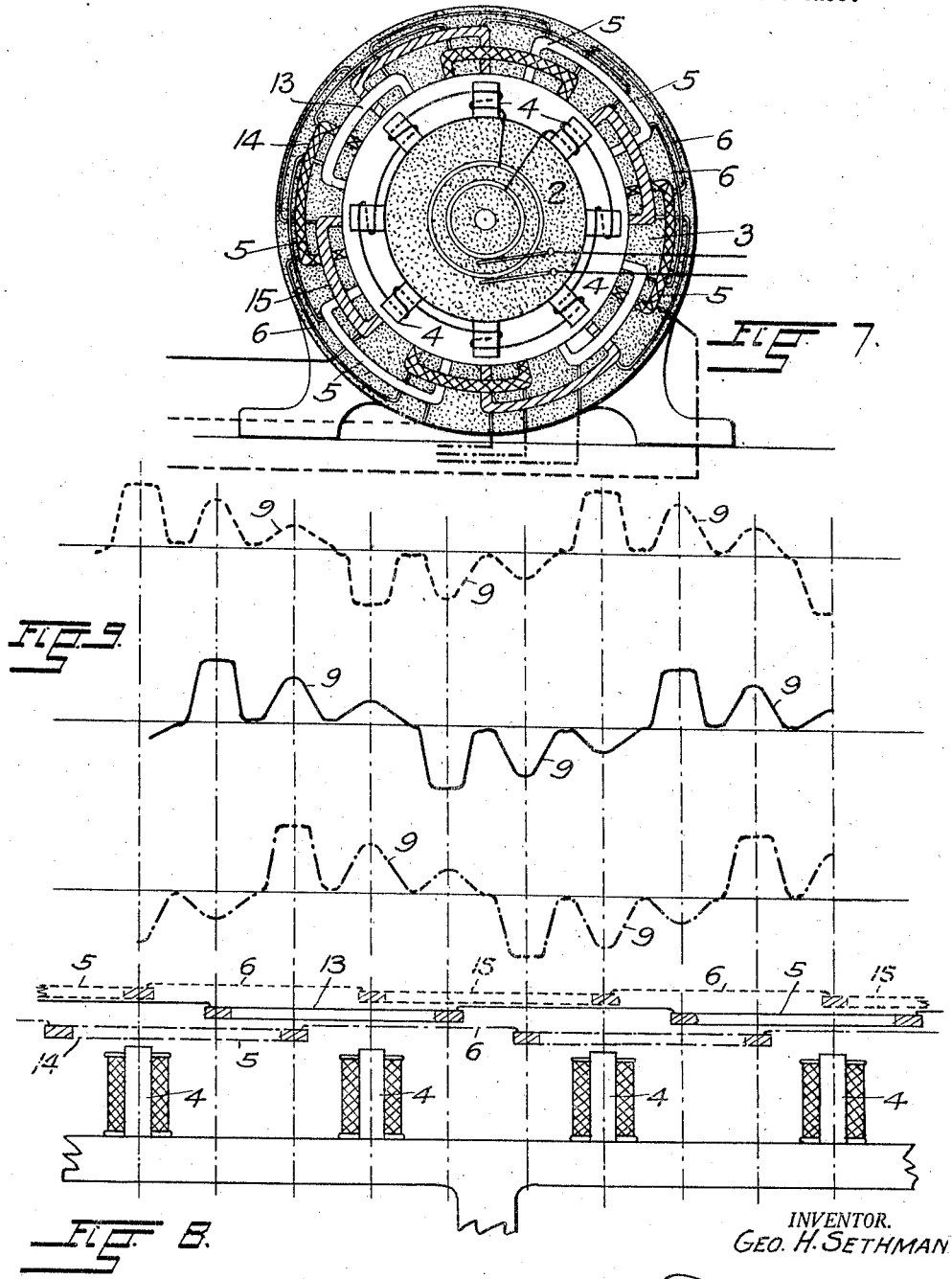

Patented Nov. 18, 1924.

1,515,971

UNITED STATES PATENT OFFICE.

GEORGE H. SETHMAN, OF DENVER, COLORADO, ASSIGNOR OF ONE-HALF TO CHARLES W. THURINGER, OF DENVER, COLORADO.

ELECTRIC GENERATOR.

Application filed September 7, 1920. Serial No. 408,635.

*To all whom it may concern:*

Be it known that I, GEORGE H. SETHMAN, a citizen of the United States, residing at Denver, in the county of Denver and State of Colorado, have invented certain new and useful Improvements in Electric Generators, of which the following is a specification.

This invention relates to electric generators and more particularly to certain new and useful improvements in generators of the type shown and described in my application for patent Serial No. 215,062, filed February 2, 1918, in which, contrary to the usual method of current generation, the inductive action is periodically interrupted in a cyclic operation.

To produce this result the poles on the field of the generator and the coils of the armature of the same are arranged so that during the rotary movement of either element with relation to the other, the poles move intermittently within the area of the armature coils, thereby causing periodic interruptions of the inductive action.

The alternations of a current produced by this method of generation are obviously spaced in accordance with the periods during which there is no direct interaction of the electromagnetic lines of force, and the lamps or other apparatus connected in the circuit must in consequence depend on their physical characteristics or the electrical properties of the circuit to continue their operation during the periods in which the generator is productively inactive.

In the generator shown and described in my application for patent hereinbefore referred to, the field poles interact with single armature coils spaced apart so that the pole pieces pass completely out of the magnetic field of one armature coil before entering and introducing lines of force in the next following one, thereby abruptly interrupting the inductive action.

It is the primary object of the present invention to provide an improved arrangement of the field poles and armature coils which by maintaining a gradually subsiding electromotive force, the current flow between the intermittent periods of maximum induced electromotive force allows the increasing of the time interval between current alternations at a comparatively slow rate of rotation.

Another object of my invention is to produce by extension of the armature coils in the circle of rotation of the field, an effective value with low potential stress due to the formation of flat-top waves in the line of electromotive forces.

A further object of the invention resides in providing an electric generator of simple, compact and highly efficient construction adapted for either single or polyphase current production.

The above and other objects all of which will be fully disclosed in the course of the following description, I attain by an arrangement of parts shown in the accompanying drawings which illustrate the preferred method of applying the principle of my invention.

In the drawings in the several views of which like parts are similarly designated—

Figure 1 represents in outline a single phase generator constructed in accordance with my invention;

Figure 2, a fragmentary development showing the relative arrangement of the armature coils and field poles of the same, and Figure 3, a diagrammatic representation of the line of electromotive force developed in the operation of the generator;

Figures 4, 5 and 6 are similarly arranged views of a two-phase generator;

Figures 7, 8 and 9 represent corresponding views of a generator of the three-phase type, and Figure 10 shows a modification in the connections of the armature coils.

In Figures 1, 4, 7 and 10 portions represented as rotor and stator structure of the generators have been stippled in order that the various elements will stand out prominently.

Referring first to Figures 1, 2 and 3 of the drawings, the reference character 2 designates the rotary field of the generator, and 3 the surrounding relatively stationary armature of the same.

The field pole pieces 4, equidistantly spaced in the periphery of the field, are relatively arranged and connected according to the usual practice, but the distances between them are made more than their widths, twice, three times, or more, etc., instead of being equal thereto or nearly so as in generators of ordinary standard construction.

The relatively stationary armature coils 5 are extended and their two portions parallel to the axis of rotation of the field, their active portions placed in the armature surface at distances apart which correspond to the distances between the centers of the field pole pieces and the different coils of the armature are separated by similar spaces between their adjacent active parts so that each two adjacent pole pieces of opposite polarity of the rotating field will span alternately the two parts of one of the armature coils in the armature surface or a space between them.

The separated armature coils are interconnected by conductors of electricity 6 and the end coils of the series connect to the line wires 7 and 8 of the circuit in which the lamps or other current-receptive devices are connected.

The coils may be divided in sections each having a fraction of the number of turns of a uni-coil and placed adjoiningly as shown in Figure 10, thus spreading the coils in what is known as the concentrated form of winding.

The connections between the coils may be made in series or parallel, as desired.

It will be apparent that the electromotive force is positively induced only when the field pole pieces are in register with the portions of the armature coils in the armature surface and that the direct inductive or generative action is discontinued when the field pole pieces move through the spaces between said portions or within the spaces of the armature coil or coils.

Referring to the diagrammatic representation of the curve of electromotive force shown in Figure 3, it will be seen that a maximum electromotive force having a substantially flat-topped wave form is produced alternately at opposite sides of the zero potential preceded by a small initial potential and followed by a corresponding low subsiding potential for each half cycle. The maximum potential generation is for a short period in each half cycle due to the concentrated winding and narrow pole pieces. The initial and subsiding potentials are produced by the magnetic flux in the field between the pole pieces. The electromotive force curve at the maximum potentials is somewhat flattened by reason of the extended area form of the coils.

The absence of high peaks in the induced curves of electromotive force diminishes the potential stress against the insulation used in the construction of the current receptive devices and their connections in the circuit of the generator, found in the saw-toothed or high peak curve produced in ordinary current generation.

As above set forth, the condition is graphically represented in Figure 3 by a gradually subsiding and rising wave 9 having a part of lesser magnitude than the preceding part of the wave, crossing the zero potential at the time the pole pieces are midway between the active portions of the armature coils, and gradually increasing in magnitude as the field pole pieces again approach the armature coils when another approximate sine curve is produced and the cycle of alternations is completed.

It will thus be seen that in contradistinction to the ordinary generator which produces by uninterrupted induction a current in which the alternations join abruptly at their points of intersection with the zero potential, this generator has an electromotive force curve made up of separated approximate sine waves connected by initial and subsiding curves of lesser magnitude.

In Figures 4, 5 and 6 of the drawings, the principle of my invention is applied to a two-phase generator. The armature has two separate series of interconnected coils 10 and 12 which overlap each other by 90° electrically and are each connected to a single two-wire circuit.

These circuits are in no way connected to each other within the generator and their curves of electromotive force are separate from each other as graphically shown in Figure 6. There is, however, a certain degree of reciprocal influence between the overlapping coils which causes the subsiding waves between the alternating sine curves to be of somewhat greater magnitude than those produced in the single-phase current generator of the first-described form and at the same time substantially shortens the initial low potential wave.

This difference in the waves has been shown more pronounced in the diagrammatic representation of the electromotive force curves in the three-phase generator illustrated in Figures 7, 8 and 9, in which three distinct and separate series of interconnected coils, 13, 14 and 15, overlap by 60 electrical degrees.

Each series of coils produces its own separate and distinct curve of electromotive force. As in the two phase generator disclosed in Figure 4 the close proximity of the coils of each series to those of the others produces still greater subsiding waves while the field poles are passing through the spaces between the embedded portions of the coils in the circumference of the armature, thus rendering the subsiding waves connecting the alternating sine curves, of a more prominent and pronounced curvature, as shown in Figure 9 in which the three curves have been shown in different lines corresponding with those used to distinguish the three series of coils in Figures 7 and 8.

It will be understood without further illustration that the circuits of the coils of the three-phase generator may be combined by either a Y- or delta-connection according to the usual practice.

With respect to the diagrammatic illustrations I desire it understood that although theoretically the wave between opposite alternations occurs in the form of a series of smaller waves of gradually diminishing peaks, in actual practice a slowly subsidiary resultant wave of the several waves is produced.

Having thus described my invention what I claim and desire to secure by Letters-Patent is:

1. In an electric generator having field and armature members one of which rotates with relation to the other, a series of field-pole pieces spaced at substantially equal distances the space between them exceeding the width of any one of said pole pieces, and a series of interconnected armature coils each having portions in the armature surface interacting with the poles the portions of each coil of the series being separated from each other and from the active portions of the adjacent coils by spaces substantially equal to the distances between the centers of any two adjacent field poles.

2. In an electric generator having field and armature members one of which rotates with relation to the other, a series of field-pole pieces spaced at distances exceeding the width of any one of said pole pieces, and a plurality of insulated series of interconnected armature coils lapping one another, the coils in each series having portions in the armature surface interacting with the field poles the active portions of the coils in each series being separated from each other by spaces substantially equal to the distances between the centers of any two adjacent field poles.

3. In an electric generator having field and armature members one of which rotates with relation to the other, a series of field-pole pieces spaced at substantially equal distances the space between them exceeding the width of any one of said pole pieces, and a plurality of insulated series of interconnected armature coils lapping one another, the coils in each series having portions in the armature surface interacting with the field-poles and separated from each other and from the active portions of the adjacent coils in the same series by spaces substantially equal to the distances between the centers of any two adjacent field poles.

4. A dynamo electric machine for the generation of polyphase alternating current in which the alternations comprise an active period followed by a subsiding period for each half cycle, comprising induced phase windings in an armature member, each phase winding of which is made up of a number of coils with their active portions mounted in the armature and separated from each other by a series of equal spaces, the active portions of each set of coils of the other phase windings similarly arranged with the active portions of all of the coils alternating with each other and equally spaced, and a relatively rotary inducing member or field having inducing elements spaced in the same angular relation as the active portions of the coils of one of the phase windings.

5. A dynamo electric machine for the generation of polyphase alternating current in distinct phases which interact upon each other so that the alternations of each phase comprise an active period for each half cycle followed by a subsiding period effected by the interaction of the active periods of each of the other phases successively, comprising induced phase windings in an armature member, each phase winding of which is made up of a number of coils mounted in the armature so that the active portions of the coils are separated by a series of equal spaces, and the coils of each of the other phase windings being similarly arranged with the active portions of all of the coils of the separate phase windings alternating with each other and equally spaced, and a relatively rotary inducing member or field comprising inducing elements which interact alternately with the active portions of the coils of the phase windings in successive periods, one phase alone during each period.

6. A dynamo electric machine for the generation of polyphase alternating currents in distinct phases having subsiding periods in the alternations of each phase covering the active periods of the alternations in all of the remaining phases, comprising induced phase windings in an armature member, each phase winding of which is made up of a number of coils mounted in the armature so that the active portions of the coils are separated by a series of equal spaces, and the coils of each of the other phase windings being similarly arranged with the active portions of all of the coils of the separate phase windings alternating with each other and equally spaced, and a relatively rotary inducing member or field comprising inducing elements spaced in the same angular relation as the active portions of the coils of one of the phase windings and each of the inducing elements having a width less than the pitch of two adjacent active portions of the phase windings.

7. A dynamo electric machine for the generation of polyphase alternating currents, comprising induced phase windings in an armature member, each phase winding of which is made up of a number of coils with their active portions mounted in the armature and separated from each other by a series of equal spaces, the active portions of each set of coils of the other phase windings similarly arranged with the active portions of all of the coils alternating with each other and equally spaced, and a relatively rotary inducing member or field having inducing elements spaced in the same angular relation as the active portions of the coils of one of the phase windings and having a polar width less than the space between two of the adjacent active portions of the phase winding coils.

8. A dynamo electric machine for the generation of polyphase alternating currents, comprising an armature member having a plurality of series of alternately arranged induced phase windings with the active portions of each of the coils of the windings equally spaced around the armature member, and a relatively rotary inducing member or field having inducing elements arranged in the same angular relation as the coils of one of the phase windings and having a width less than the space between two adjacent active portions of the phase winding coils.

In testimony whereof I have affixed my signature.

GEORGE H. SETHMAN.